United States Patent [19]
Nilsson et al.

[11] 3,805,223
[45] Apr. 16, 1974

[54] ULTRASONIC DETECTOR

[75] Inventors: Gert Nilsson; Mats Oberg, both of Malmo, Sweden

[73] Assignee: AB Farad, Hagersten, Sweden

[22] Filed: Nov. 10, 1972

[21] Appl. No.: 305,579

[30] Foreign Application Priority Data
Nov. 12, 1971 Sweden............................. 14496/71

[52] U.S. Cl. .............................. 340/3 R, 340/8 FT
[51] Int. Cl. ................................................. G01s 9/70
[58] Field of Search ........... 340/1 R, 1 T, 3 R, 8 FT

[56] References Cited
UNITED STATES PATENTS
3,042,899   7/1962   Kendall et al. .................. 340/1 T X
3,733,580   5/1973   Beeken .............................. 340/1 R
3,086,196   4/1963   Sande.............................. 340/1 T X Primary Examiner—Richard A. Farley

[57] ABSTRACT

A system for detecting an object in a body of water bounded by a pair of oppositely spaced walls utilizes ultrasonic sound pulses which are transmitted between the two walls to a receiver in a path reflected by the walls; a delay circuit is employed to ensure that the entire space between the walls will be covered by the reflected pulses.

2 Claims, 2 Drawing Figures

ULTRASONIC DETECTOR

The present invention refers to a device for detecting the presence of ultrasonic reflecting objects within a well defined space. The device is preferably used for detecting fish or other animals in water.

In biological studies of the behaviour of fish or other animals in water the methods available are rather limited. Thus visual observations are difficult to perform during a longer period and cannot be made in darkness. A study of the oxygen consumption could at its best give a mean value for the activity during a longer period whereas mechanical detectors limit the free movements of the animals. Devices using light beams, where the animals when moving intersect the beams to different photocells implies that the fish will not be subject to their normal rhythm as to the light conditions.

The above cited drawbacks are, however, eliminated if ultrasound of a frequency sufficiently high not to disturb the animals is used. A number of devices for measuring the activity by using ultrasound are also known. Thus it is known per se to use the doppler effect by transmitting continuous sound waves and measuring the frequency of the transmitted waves as well as the waves reflected from the animal, the frequency difference hereby forming a measure of the velocity of the animals in the direction of the waves. The drawback is, however, that if a closed space is used, a high number of waves which have been reflected towards the walls of the space various number of times will meet the animals from angles and give rise to a high number of signals of different frequencies, the result thus being difficult to evaluate. It is also possible to detect the movement of the animals by measuring the amplitude and/or the phase of the reflected sound waves, but this method will also imply that a high number of different waves which have passed through different paths will give rise to a signal at the receiver which is difficult to evaluate. It is for instance possible that a movement of an object which gives rise to an amplitude and a phase change of a wave which reaches the receiver after a certain number of reflections, also gives rise to compensating effects from waves reaching the receiver after another number of reflections, the movement thus being indetectable.

It is an object of the present invention to provide a detector by means of which objects within a certain detected space could be detected with a high accuracy. By using one or several such detectors located suitably in a container one could easily measure the activity of the animals in the container and also determine the time during which the animals are located within a space detected by a certain detector. The characteristics of the invention will appear from the enclosed claim.

The invention will now be described in detail reference being made to the drawing in which.

Figure 1:
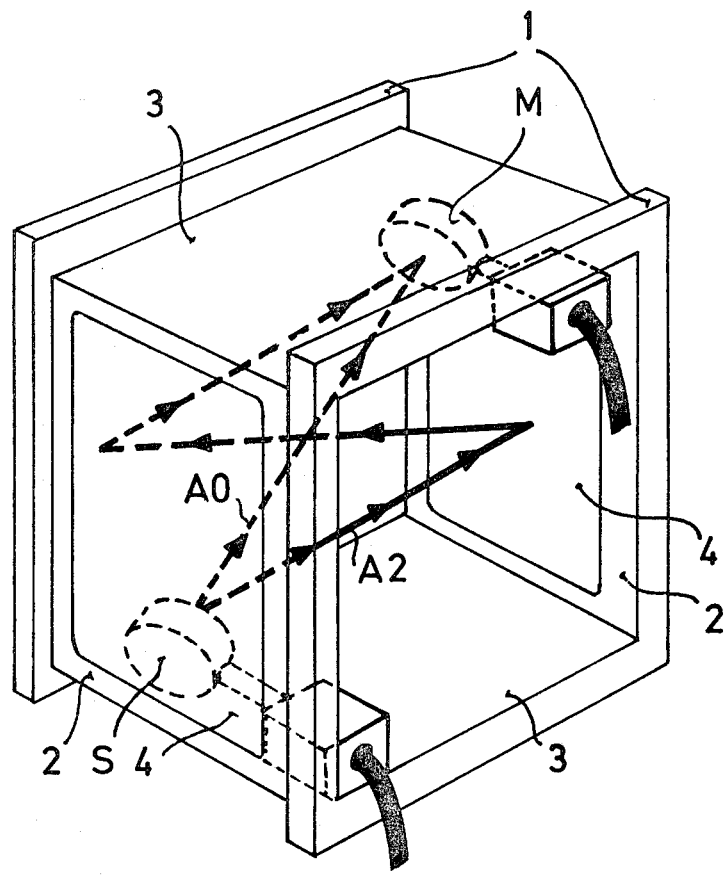
FIG. 1 is a perspective view of a detector according to the invention.

Referring now to FIG. 1 which shows the mechanical design of the detector, reference 1 denotes two rectangular frames which are interconnected by two vertical partitions 2, and two horizontal partitions 3. The vertical partitions 2 are designed so as to reflect incident ultrasonic waves. In the device according to FIG. 1 this achieved by providing the partitions with airfilled cavities 4. The horizontal walls are made from an ultrasound absorbing material. The detector further comprises an ultrasonic transmitter S located in one corner of the frame and a receiver M in the opposite corner. The transmitter and the receiver are made from crystals transforming electrical signals to accustic signals and vice versa.

The operation of the apparatus according to FIG. 1 will now be explained, reference being made to the network of FIG. 2. The transmitter S in the lower corner of the frame in FIG. 1 is supplied from an oscillator by pulses of high frequent energy. The pulse frequency and the energy within each pulse have a frequency which is sufficiently high not to affect the animals to be detected. Each pulse transmitted from the transmitter will give rise to a number of pulses in the receiver M due to the fact that the waves reach the receiver after a varying number of reflections between the vertical partitions. In FIG. 1 waves reaching the receiver directly (A0) and waves reaching the receiver after two reflections (A2) are indicated. The time required for the ultrasound from the transmitter to reach the receiver is then dependent on the number of reflections. In order to detect the presence of an object of a certain size which is brought into the detector it will be necessary to analyse a wave which has been reflected so many times that it necessarily should have been cut of if an object would have been present in the detector. This is achieved by blocking the receiver a certain period after the pulse have been transmitted from the transmitter, pulses reaching the receiver after none or a small number of reflections not being registered.

Figure 2:
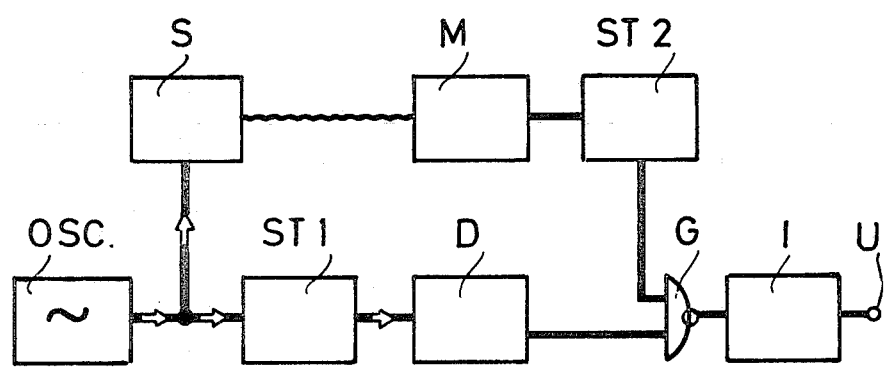
FIG. 2 is an embodyment of the electric network for the detector according to FIG. 1.

Thus in the network according to FIG. 2 the output signal from the oscillator is supplied to the transmitter S as well as to a level detector ST1, for instance a Schmidt-trigger which gives rise to a direct voltage signal during the pulse. The output signal of the level detector is then delayed in a delay circuit D, the delay being equal to the time required for a wave, which necessarily detects the object, to reach the receiver. The output signal of the delay circuit is supplied to one input of an AND-circuit G, the other input of which is connected to the receiver M via a level detector ST2 of the same design as the detector ST1. Provided that no object is present in the detector, both inputs of the gate G will simultaneously be supplied by pulses and a corresponding pulse train is obtained at the output of the gate. As soon as an object is moved into the detector, the receiver M will not receive any signal after the time which is determined by the delay circuit D and thus the pulse train will cease. If a suitable intergrating circuit I is connected to the output of the gate G, one will thus at the output U of the device obtain two different direct voltage levels depending on whether an object is present in the detector. By analysing the output signal it is thus possible to determine the period of time during which an animal is present in the detector and also how many times it passes into and out from the detector during a certain period of time.

By using the apparatus according to the invention it is also possible to determine if an object is present at a certain specific location within the frame. It is namely possible to determine the waves which intersect each other in this point and to determine when these two waves are eliminated simultaneously. In order to provide this it would however be necessary to use a number of parallel delay circuits having delays corresponding to the respective waves.

We claim:

1. Device for detecting the presence of ultrasonic reflecting objects within a space defined by a pair of opposed ultrasonic reflecting wall panels comprising transmitter means including oscillator means for producing ultrasonic pulses in said space to be reflected between said pair of wall panels, receiver means for detecting ultrasonic pulses received by reflection from said wall panels, circuit means including time delay means and gating means connected with said transmitter means and said receiver means, said time delay means being responsive to the transmission of a pulse for blocking the gating means for a period of time required for a predetermined number of reflections of said pulses between the wall panels, said gating means being responsive to the receiver means and the time delay means for indicating the detection of a pulse by the receiver means only after said predetermined number of reflections.

2. The invention defined in claim 1, wherein said gating means comprises an electrical AND circuit means.

* * * * *